(12) United States Patent
Ayliffe

(10) Patent No.: US 7,158,549 B2
(45) Date of Patent: Jan. 2, 2007

(54) SUPPORT STRUCTURE FOR AN OPTICAL DEVICE

(75) Inventor: Michael H. Ayliffe, San Jose, CA (US)

(73) Assignee: Bookham Technology Plc, Northhamtonshire (GB)

( * ) Notice: Subject to any disclaimer, the term of this patent is extended or adjusted under 35 U.S.C. 154(b) by 270 days.

(21) Appl. No.: 10/995,701

(22) Filed: Nov. 23, 2004

(65) Prior Publication Data

US 2005/0135443 A1    Jun. 23, 2005

Related U.S. Application Data

(60) Provisional application No. 60/525,984, filed on Dec. 1, 2003.

(51) Int. Cl.
*H01S 3/04*    (2006.01)
*H01L 23/48*    (2006.01)

(52) U.S. Cl. .............................. 372/34; 372/36; 257/750
(58) Field of Classification Search .................. 372/34, 372/36; 257/750
See application file for complete search history.

(56) References Cited

FOREIGN PATENT DOCUMENTS

JP          08-029646    *    2/1996

* cited by examiner

*Primary Examiner*—Armando Rodriguez
(74) *Attorney, Agent, or Firm*—Parsons & Goltry; Robert A. Parsons; Michael W. Goltry

(57) ABSTRACT

An optical subassembly includes a substrate, a heat spreader, and a submount. The submount has a submount mounting surface and a component mounting surface with either the submount mounting surface or the component mounting surface including an angle. The submount is positioned on either the heat spreader or the substrate such that the component mounting surface is positioned at the angle relative to the substrate. An optoelectric device is positioned on the component mounting surface and coupled to interconnects on the substrate. The optoelectric device is thermally coupled to the heat spreader through the submount to provide a low thermal resistance between the optoelectric device and the heat spreader. An encapsulant structure is mounted on the substrate and hermetically encloses the optoelectric device. The encapsulant structure includes a window positioned to pass light between the optoelectric device and an externally mounted optical fiber.

22 Claims, 5 Drawing Sheets

SUPPORT STRUCTURE FOR AN OPTICAL DEVICE

CROSS-REFERENCE TO RELATED APPLICATIONS

This application claims the benefit of U.S. Provisional Application No. 60/525,984, filed 1 Dec. 2003.

FIELD OF THE INVENTION

This invention relates to optical packaging and, more particularly, to mounting an optoelectric device on a support structure to form an optical subassembly.

BACKGROUND OF THE INVENTION

Optoelectronics is a rapidly expanding technology that is an important component in modern communications systems wherein it is desired to transmit vast amounts of data over long distances in a short period of time. With the increasing commercial applications for optoelectronic systems, there is a need to develop cost effective and precise manufacturing techniques for assembling optoelectronic modules (e.g., optical subassemblies, fiber-optic cable repeaters, transmitters, etc.).

Transmitters used in optical fiber communications systems typically require a package containing a semiconductor laser coupled to an optical fiber that extends from the package. A major challenge in constructing such transmitters is in forming optical subassemblies which are hermetically sealed and for which the light emitting device operates at low temperatures. Hermetic sealing and low temperature operation are required in some applications to increase performance and lifetime of the light emitting device and transmitting package.

One problem with hermetic sealing in optical subassemblies is the poor yield due to insufficient sealing at a glass/metal interface. Typical interfaces are formed using parallel seam welding which provides inconsistent sealing that may leave gaps at the interface. Another problem with hermetic sealing is that the device structure provides no feature or lid to assist in the external alignment of the light emitting device and the optical fiber. Still another problem is the limited space within the optical subassembly to position other optical components such as a lens, an optical isolator, or the like. While hermetic sealing is a problem in the present art, low temperature operation is the major challenge. The main problem to be solved is to achieve a low thermal resistance between the laser or light generator and a heat spreader designed and mounted to carry heat from the laser or light generator.

It would be highly advantageous, therefore, to remedy the foregoing and other deficiencies inherent in the prior art.

It is an object of the present invention to provide a new and improved optical subassembly.

Another object of the present invention is to provide a new and improved support structure for mounting an optical device.

A further object of the present invention is to provide a new and improved hermetically sealed optical subassembly with greater thermal conductivity (i.e. improved thermal stability) and improved coupling to external optical components, such as optical fibers and the like.

A further object of the present invention is to provide a new and improved optical subassembly that is simpler to manufacture and assemble with improved optical alignment.

SUMMARY OF THE INVENTION

Briefly, to achieve the desired objects of the instant invention in accordance with a preferred embodiment thereof, an optical subassembly is provided that includes a substrate, a heat spreader, and a submount. The submount has a submount mounting surface and a component mounting surface with either the submount mounting surface or the component mounting surface including an angle. The submount is positioned on either the heat spreader or the substrate such that the component mounting surface is positioned at the angle relative to the substrate. An optoelectric device is positioned on the component mounting surface and coupled to interconnects on the substrate. The optoelectric device is thermally coupled to the heat spreader through the submount to provide a low thermal resistance between the optoelectric device and the heat spreader. An encapsulant structure is mounted on the substrate and hermetically encloses the optoelectric device. The encapsulant structure includes a window positioned to pass light between the optoelectric device and an externally mounted optical fiber.

In a specific embodiment of the present invention, an optical subassembly is provided that includes a substrate with electrically conductive interconnects thereon. The substrate has first and second opposed surfaces and at least a portion of the electrically conductive interconnects are positioned on the first surface. The optical subassembly further includes a heat spreader having a surface and a submount including a submount mounting surface and a component mounting surface. Either the submount mounting surface or the component mounting surface includes an angle and the submount is positioned on either the surface of the heat spreader or the first opposed surface of the substrate such that the component mounting surface is positioned at an angle relative to the first opposed surface of the substrate. A semiconductor laser is positioned on the component mounting surface and a component interconnect of the semiconductor laser is coupled to the electrically conductive interconnects of the substrate. The semiconductor laser is thermally coupled to the heat spreader through the submount to provide a low thermal resistance between the semiconductor laser and the heat spreader. An encapsulant structure is mounted on the first opposed surface of the substrate and hermetically encloses the semiconductor laser. The encapsulant structure includes a window positioned to pass light from the semiconductor laser external to the encapsulant structure. An optical fiber with an angularly cut facet is positioned external to the window in the encapsulant structure for receiving light from the semiconductor laser. An optical element is mounted on either the window or the submount so as to be interposed in light passing between the semiconductor laser and the window. The one of the submount mounting surface or the component mounting surface is angled so that the optoelectric device and the facet of the optical fiber are optimally aligned.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF DRAWINGS

Figure 1:
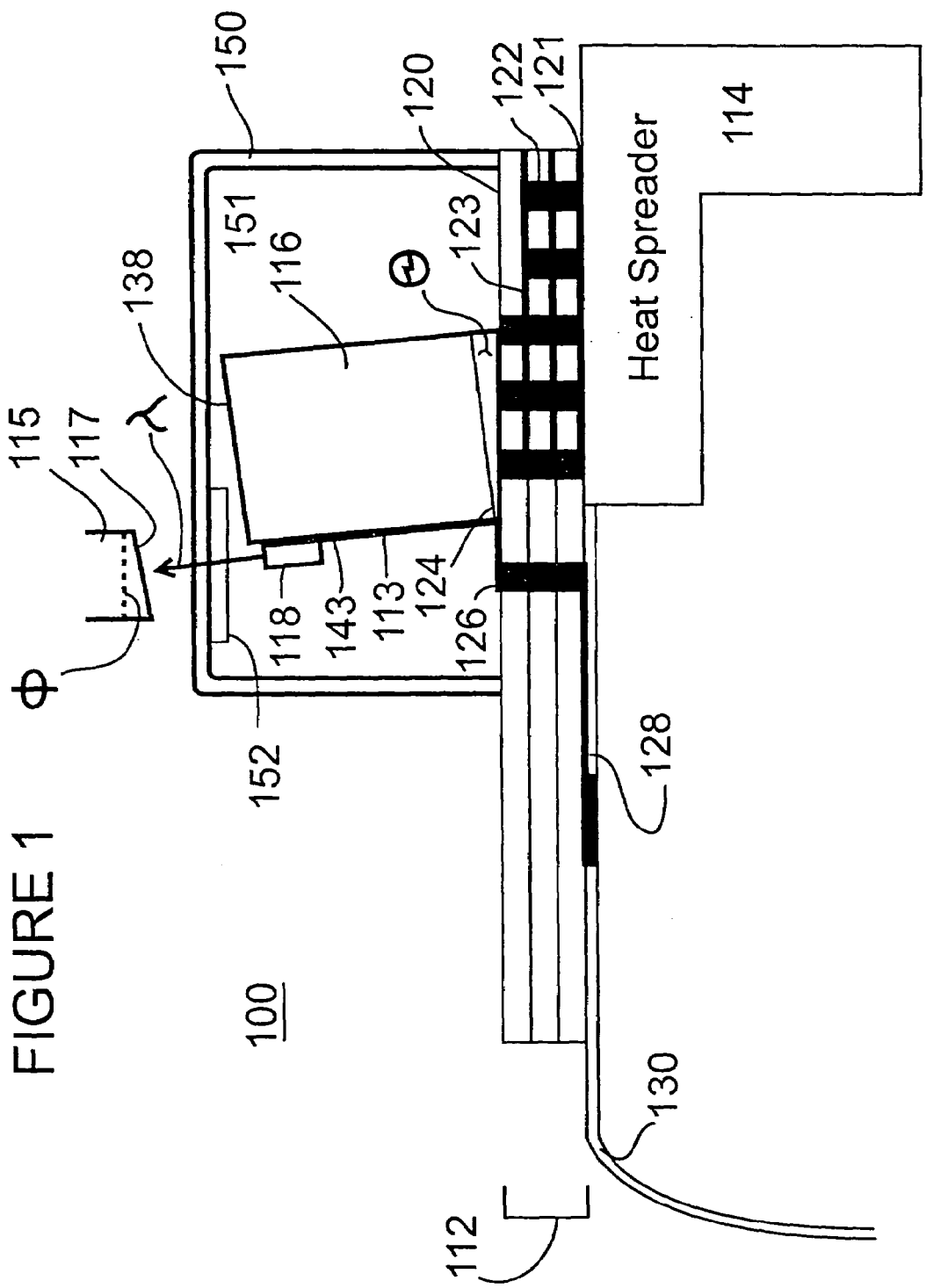
FIG. 1 is a sectional view of an optical subassembly in accordance with the present invention.

Turning now to FIG. 1, a sectional view of an optical subassembly 100 is illustrated in accordance with the present invention. It will be understood by those skilled in the art that subassemblies of the type discussed herein generally include a pair of channels, one of which receives electrical signals, converts the electrical signals to optical (light) beams by way of a light emitting device and may introduce them into one end of an optical fiber, which then transmits the modulated optical beams to external apparatus. The term optoelectric device for these channels is intended to denote any light source including, for example, a laser, a light emitting diode, the end of a light communicating optical fiber, or the like.

The second channel of the module generally receives modulated optical beams from an optical fiber connected to the external apparatus, conveys the modulated optical beams to a photodetector, or the like, which then converts the modulated optical beams to electrical signals. For these channels, the term optoelectric device is intended to denote any light receiving structures including any one of a photodiode, a pin diode, an end of a light communicating optical fiber, or the like.

In the following description, the apparatus and methods can generally be used in either of the channels, but since the optical portions of the two channels are substantially similar, only the transmitting channel will be discussed with the understanding that the description applies equally to both the transmitting and light receiving channels.

Subassembly 100 includes a substrate 112 with a surface 121 and an opposed surface 120. It will be understood that substrate 112 may include alumina, a low temperature co-fired ceramic, or a similar support material with a desired property for thermal conduction. Further, it will be understood that substrate 112 may include a single layer or several stacked layers. For example, substrate 112 illustrated in FIG. 1 includes three layers for simplicity and ease of discussion. Further, it will be understood that substrate 112 may include control circuitry, optics, and other optoelectronic components.

Optical subassembly 100 also includes a heat spreader 114 positioned on surface 121. It will be understood that heat spreader 114 may include any material with high thermal conductivity, such as copper, aluminum, aluminum nitride, or the like. Optical subassembly 100 further includes a submount 116 with surfaces 124, 138, and 143, wherein surface 124 is positioned on surface 120 and surface 143 extends between surfaces 124 and 138. For convenience, Surface 124 is referred to as a submount mounting surface for submount 116 and surface 143 is referred to as a component mounting surface. It will be understood that submount 116 will generally (but not necessarily) be semiconductor mounting material. i.e. formed of a thermally conductive dielectric material and may include, for example, aluminum nitride, beryllium oxide, or the like.

An optoelectric device 118 is positioned on surface 143 of submount 116. As discussed above, optoelectric device 118 may include a laser, a light emitting diode, the end of a light communicating optical fiber, or the like. A typical laser may include a vertical cavity surface emitting laser, an edge emitting laser, a diode, or the like, and may emit light at a desired wavelength. For example, typical wavelengths used for fiber optics are around 1310 nanometers (nm) or 1550 nm. However, it will be understood that other wavelengths may be appropriate. Alternatively, it will be understood that optoelectric device 118 may include a light receiving structure including any one of a photodiode, a pin diode, an end of a light communicating optical fiber, photodetector, another light sensitive device, or the like, as discussed previously.

Surface 124 is thermally connected to heat spreader 114 by thermal coupling or thermal vias 122, wherein thermal vias 122 make thermal contact with submount 116 and heat spreader 114. It will be understood that thermal vias 122 may include copper (Cu), tungsten (W), combinations of the two, or another thermally conductive material with a desired low thermal conductivity. It will also be understood that portions 123 of thermal vias 122 may be sandwiched between layers included in substrate 112 to provide more heat conduction between submount 116 and heat spreader 114 and to provide a staggered alignment of thermal vias 122 and to improve hermiticity, as will be discussed below.

An electrically conductive interconnect 113 is electrically connected to optoelectric device 118 and electrically connected to an electrically conductive via 126, where electrically conductive interconnect 113 is, in this embodiment, positioned on surface 143 of submount 116. An electrically conductive interconnect 128 is electrically connected to electrically conductive via 126 and positioned on rear or lower surface 121 of substrate 112. Further, an external conductive interconnect 130, which in this embodiment is a flex-cable or the like, is electrically connected to interconnect 128. External conductive interconnect 130 may be in electrical communication with external electronic circuitry (not shown) which provides signals to (or receives signals from) optoelectric device 118. While electrical connections are described for opposed surfaces of substrate 112, it will be understood that all electrical connections could be on the same side (e.g. top side 120) in some specific embodiments. Also, it will be understood that in some embodiments, optoelectric device 118 may be optically pumped instead of electrically pumped.

An encapsulant structure 150 is positioned on surface 120 of substrate 112 to provide a hermetic environment for optoelectric device 118. It will be understood by those skilled in the art that encapsulant structure 150 can be, for example, a TO can, or other metal or ceramic enclosure. Encapsulant structure 150 includes a window 152 (including material transparent to the operating wave length, $\lambda$) to allow light $\lambda$ to travel between optoelectric device 118 and the exterior of encapsulant structure 150. It will be understood that substrate 112 and encapsulating structure 150 (when hermetically sealed together) form a hermetically sealed cavity 151 for optoelectric device 118 to improve a device lifetime of device 118. In the preferred embodiment, the hermetically sealed cavity is formed large enough to house various optical components, such as submount 116, a lens (may be included in window 152), or an optical isolator (may be included in window 152).

In this preferred embodiment, surface 124 of submount 116 is formed at an angle $\theta$ as illustrated so that optoelectric device 118 is tilted and light $\lambda$ is optimally aligned with a facet of an optical fiber 115, which is external to hermetically sealed cavity 151. Here it should be understood that the angle θ, as measured relative to surface 120 of substrate 112, is an angle less than ninety degrees and is referred to for simplicity by the term "angled". Thus, in this embodiment, mounting surface 124 is angled. In this embodiment, an end surface 117, or inlet facet, of optical fiber 115 is formed at an angle φ, wherein φ is equal to approximately 8°. To maximize optical alignment between the light output of optoelectric device 118 and optical fiber 115 with the inlet facet angled at an angle φ equal to approximately 8°, θ is equal to approximately 3.8° so that the coupling efficiency of light λ into surface 117 is optimized. It will be understood, however, that the angle θ will generally depend on the angle φ and the use of θ equal to approximately 3.8° and φ equal to approximately 8° is for illustrative purposes only.

Thus, light λ emitted from optical subassembly 100 is optimally coupled into optical fiber 115 as discussed above by choosing the angle θ. Further, subassembly 100 includes a thermally conductive path through submount 116, thermal vias 122, and heat spreader 114 to conduct heat generated by optoelectric device 118 away from optoelectric device 118 and to maintain the temperature substantially constant.

Figure 2:
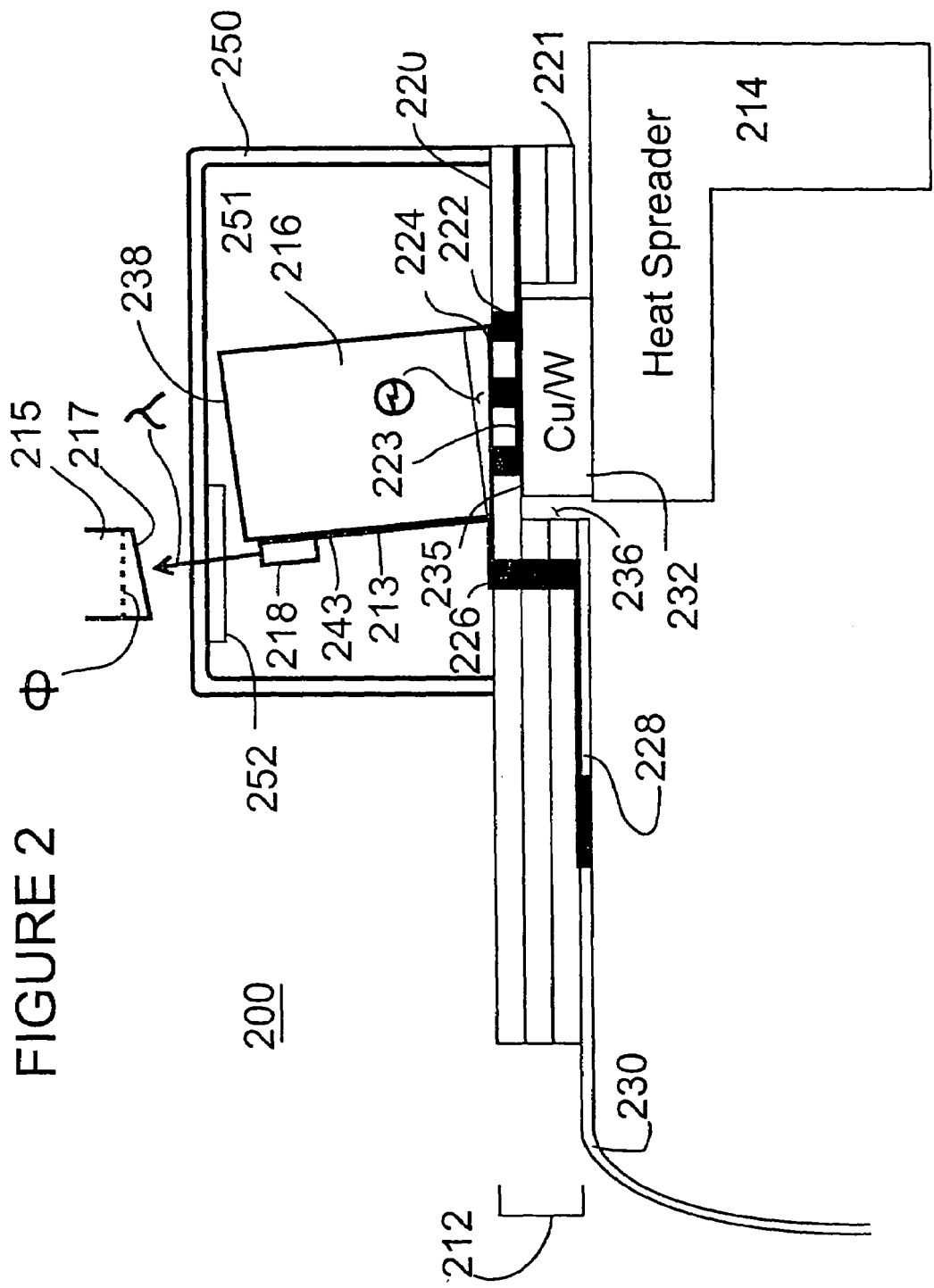
FIG. 2 is a sectional view of another embodiment of an optical subassembly in accordance with the present invention.

Turn now to FIG. 2 which illustrates an embodiment of an optical subassembly 200 in accordance with the present invention. It will be understood that in the following discussion, components which are similar to elements illustrated in FIG. 1 are designated with similar numbers beginning with a "2" in front to indicate the different embodiment. For example, external conductive interconnect 130 illustrated in FIG. 1 is illustrated as external conductive interconnect 230 in FIG. 2. Also, the above description of the various components in FIG. 1 applies equally to similar components illustrated in FIG. 2.

In FIG. 2, substrate 212 includes a trench 236 extending partially through substrate 212. A heatsink 232 with an upper surface 235 is positioned in trench 236. It will be understood that heatsink 232 includes any material with high thermal conductivity, such as copper, copper-tungsten, aluminum, aluminum nitride, or the like. Further, the lower surface of heatsink 232 is positioned in thermal communication with a heat spreader 214 positioned below or to the rear of substrate 212. Surface 235 of heatsink 232 is positioned in thermal communication with a lower surface of thermal vias 222 formed in an upper layer of substrate 212. Also, thermal vias 222 are positioned in thermal contact with submount 216, as discussed above. Heatsink 232 decreases the thermal resistance between optoelectric device 218 and heat spreader 214. Further, trench 236 allows easier alignment between heat sink 232 and thermal vias 222.

Also, optical subassembly 200 is optimally aligned to an optical fiber 215, as discussed above, by choosing an angle θ compatible with an angle φ. Further, the thermal conductivity between optoelectric device 218 and heat spreader 214 is increased by positioning heatsink 232 between heat spreader 214 and thermal vias 222. In addition, trench 236 allows easier alignment between heat sink 232 and thermal interconnects 222.

Figure 3:
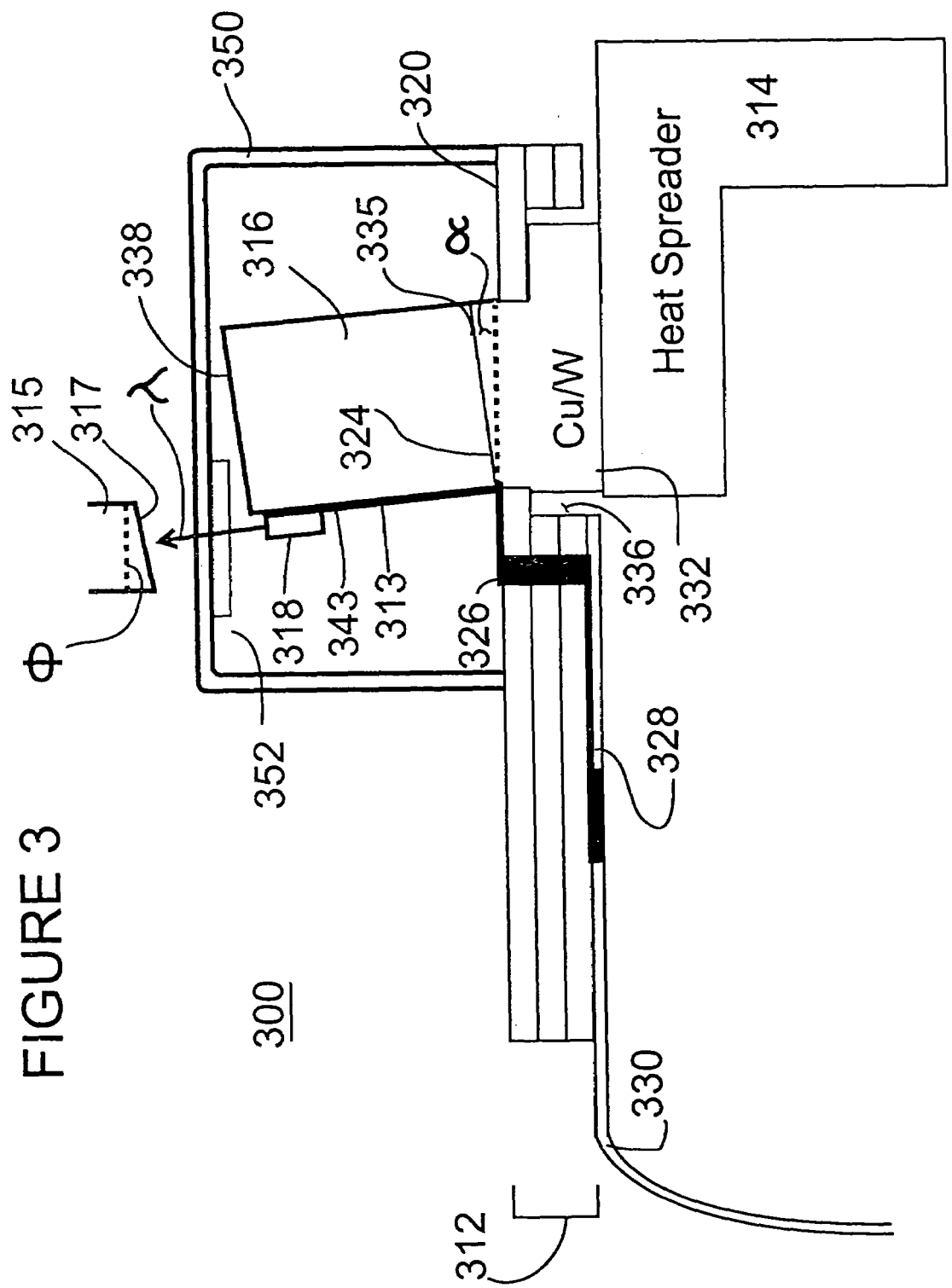
FIG. 3 is a sectional view of an embodiment of an optical subassembly in accordance with the present invention.

Turn now to FIG. 3 which illustrates an embodiment of an optical subassembly 300 in accordance with the present invention. It will be understood that in the following discussion, components which are similar to elements illustrated in FIG. 2 (or FIG. 1) are designated with similar numbers beginning with a "3" in front to indicate the different embodiment. For example, external conductive interconnect 230 illustrated in FIG. 2 is illustrated as external conductive interconnect 330 in FIG. 3. Also, the above description of the various components in FIG. 2 applies equally to similar components illustrated in FIG. 3.

In this embodiment, a trench 336 extends through substrate 312 as illustrated with heatsink 332 positioned in trench 336. Further, heatsink 332 has an upper surface 335 formed at an angle α. Thus, in this embodiment, upper surface 335 is angled. Heatsink 332 is beveled around the upper periphery to fit into an opening in an upper layer of substrate 312 so that the beveling provides hermetic sealing between substrate 312 and heatsink 332 when properly sealed with a hermetic sealant (e.g. material similar to that used to seal encapsulant structure 350 to substrate 312, i.e. solder, welding, or other hermetic sealants). Further, encapsulant structure 350, substrate 312, and heat sink 332 cooperate to form hermetically sealed cavity 351.

In FIG. 3, a heat sink 332 and a component mounting portion 316 cooperate to form a submount. Generally, heatsink 332 and component mounting portion 316 can be considered a unit with heatsink 332 forming a portion of the submount. However, they will generally be manufactured separately. Surface 324 of component mounting portion 316 is positioned on surface 335 of heatsink 332 for direct heat communication. It will be understood that either surface 324 of component mounting portion 316 or the mating surface of heat sink 332 can be angled (in this embodiment formed at an angle to the horizontal). Here it should be noted that thermal vias 122 or 222 (See FIGS. 1 and 2, respectively) are not included, thereby simplifying manufacturing and assembly. Further, component mounting portion 316 and heatsink 332 may be soldered together, or otherwise fixed together, to provide a better and more repeatable thermal conductivity between component mounting portion 316 and heatsink 332.

In this embodiment, surface 335 of heatsink 332 is formed at an angle α, as illustrated, so that optoelectric device 318 is tilted and light λ is optimally aligned with angled facet 317 of optical fiber 315. In this embodiment, facet 317 of optical fiber 315 is formed at the angle φ, wherein φ is equal to approximately 8°. To maximize optical alignment between optoelectric device 318 and optical fiber 315, with φ equal to 8°, α is equal to approximately 3.8° so that coupling efficiency into facet 317 of optical fiber 315 is optimized. It will be understood, however, that α will generally depend on φ and the use of α equal to 3.8° and φ equal to 8° is for illustrative purposes only.

Thus, optical subassembly 300 is optimally aligned to optical fiber 315, as discussed above, by choosing the angle α. Further, subassembly 300 includes an improved thermally conductive path through component mounting portion 316, and heat spreader 314 to conduct heat generated by optoelectric device 318 away from optoelectric device 318. Also, subassembly 300 is fabricated with fewer steps because the formation of thermal vias between component mounting portion 316 and heatsink 332 is not included in this embodiment.

Figure 4:
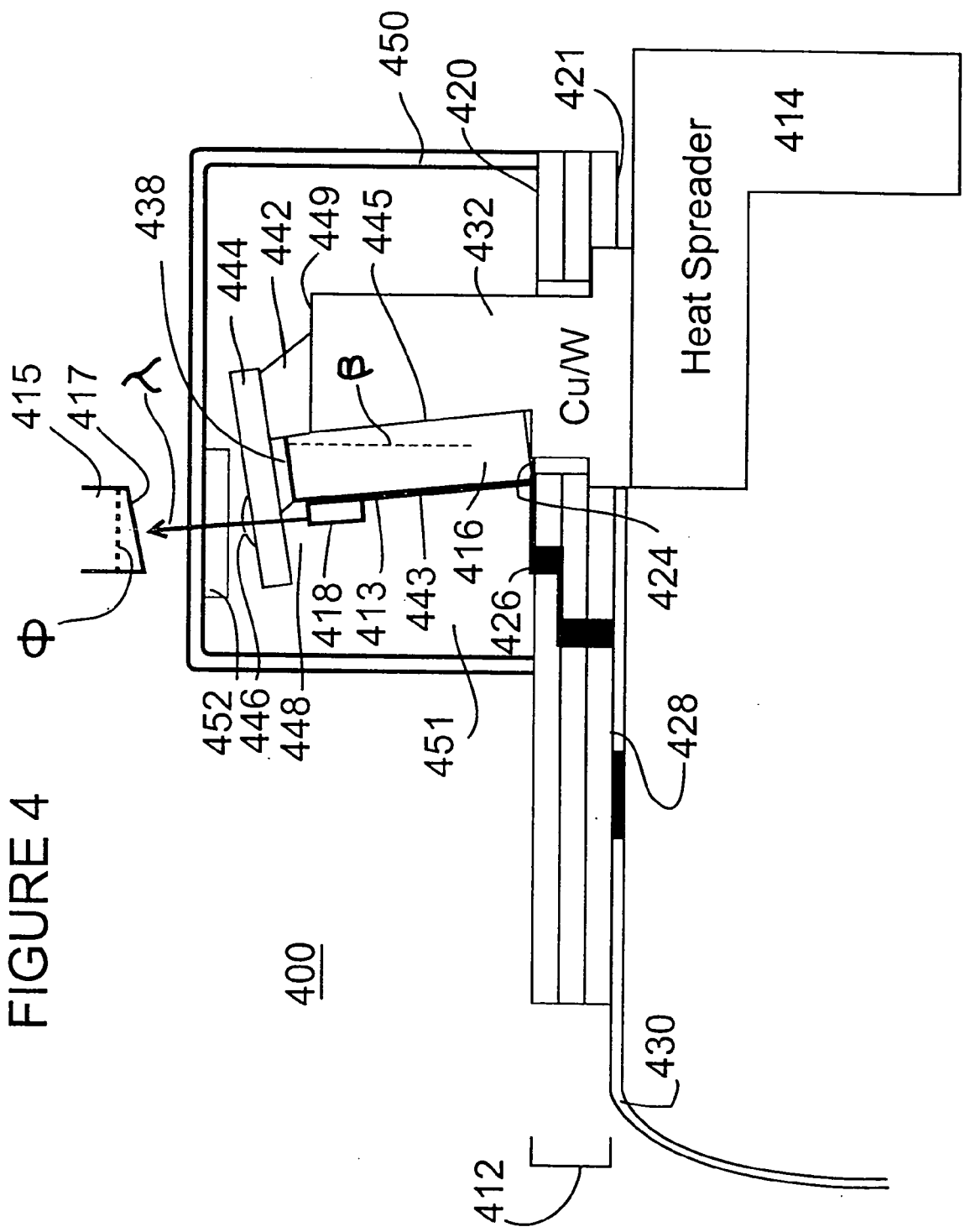
FIG. 4 is a sectional view of an embodiment of an optical subassembly in accordance with the present invention.

Turn now to FIG. 4 which illustrates an embodiment of an optical subassembly 400 in accordance with the present invention. It will be understood that in the following discussion, components which are similar to elements illustrated in FIG. 3 are designated with similar numbers beginning with a "4" in front to indicate the different embodiment. For example, external conductive interconnect 330 illustrated in FIG. 3 is illustrated as external conductive interconnect 430 in FIG. 4. Also, the above description of the various components in FIG. 3 applies equally to similar components illustrated in FIG. 4.

In this embodiment, optical subassembly 400 includes a heatsink 432 with a side surface 445, wherein surface 445 may be formed at an angle β as illustrated. Angle β is measured relative to a plane parallel to the opposite side of heatsink 432, generally a vertical plane. Further, a substantially rectangularly shaped (i.e. parallel opposed sides) submount 416 is positioned on surface 445 so that optoelectric device 418, which is mounted on one opposed surface of submount 416, is oriented at the angle β, as discussed below. Generally, submount 416 is any standard semiconductor mounting material, i.e. formed of a thermally conductive dielectric material and may include, for example, aluminum nitride, beryllium oxide, or the like. It will be understood by those skilled in the art that optoelectric device 418 and electrically conductive interconnect 413 can be formed on submount 416 as a preformed or unit subassembly or submount 416 and heatsink 432 can be formed as a unit subassembly, either of which can greatly simplify manufacturing and assembly. Thus, in this embodiment, treating optoelectric device 418 with electrically conductive interconnect 413 and submount 416 as a unit, component mounting surface 445 is angled.

In this embodiment, an optical lens 444 is fixedly attached to an upper surface 438 of submount 416 and, through a mounting block 442, to an upper surface of heatsink 432 for stability. Optical lens 444 may be fixedly attached to surface 438 using an adhesive material 448, or solder, or the like. Here it should be noted that a similar lens is generally included in each of the previously described embodiments to focus light emitted from laser 418 (also lasers 318, 218, and 118) onto inlet facet 417 of optical fiber 415 (also facets 317, 217, and 117 of fibers 315, 215, and 115).

Optical lens 444 may include an optical block with an external lens 446 formed on a surface thereof or it may include an internal lens, Fresnel lens, etc. Optical lens 444 focuses light λ emitted from optoelectric device 418 into optical fiber 415 if optoelectric device 418 includes a light emitting device. Alternatively, lens 444 may be used to focus light onto optoelectric device 418 if optoelectric device 418 includes a photodetector. Lens 444 may include a planoconvex shape and is formed in a compact structure to minimize any misalignment as a function of temperature between optoelectric device 418 and optical fiber 415.

In this embodiment, lens 444 is formed of plastic and may be, for example, molded to simplify manufacturing of optical subassembly 400, or any of the previously described embodiments. It should be understood that the term "plastic" is used herein as a generic term to describe any non-glass optical material that operates to transmit optical beams of interest therethrough (i.e. transparent to light λ) and which can be conveniently formed into lenses and the like. In some specific embodiments optical lens 444 may be formed of glass or similar materials, if desired. For example, in most optical modules used at the present time the optical beams are generated by a laser that operates in the infrared band and any materials that transmit this light, including some oxides and nitrides, come within this definition.

As mentioned previously, surface 445 of heatsink 432 is formed at the angle β so that optoelectric device 418 (including submount 416) is tilted and light λ is optimally aligned with optical fiber 415. As previously explained, an end or facet of optical fiber 415 is formed at an angle φ, for example φ may be equal to approximately 8°. To maximize optical alignment between optoelectric device 418 and optical fiber 415, with φ equal to approximately 8°, β is equal to approximately 3.8° so that coupling efficiency of light λ into facet 417 is optimized. It will be understood, however, that β will generally depend on φ and the use of β equal to 3.8° and φ equal to 8° is for illustrative purposes only.

Optical subassembly 400 is optimally aligned with optical fiber 415 as discussed above by choosing the angle β. Thus, subassembly 400 includes a thermally conductive path through submount 416, heatsink 432, and heat spreader 414 to conduct heat generated by optoelectric device 418 away from optoelectric device 418 and subassembly 400. It should be noted that the reduction in overall size of submount 416 and the increased size and proximity of heatsink 432 greatly improves the thermal conductivity of subassembly 400. Because of the novel construction of subassembly 400, including the high thermal conductivity materials (e.g. copper, copper-tungsten, aluminum, etc.) used in heat sink 432 and the solder interfaces and solder interface materials, the thermal conductivity is improved even over the embodiments illustrated in FIGS. 1–3. In addition, the cost of laser submount 416 is substantially reduced (relative to the embodiments illustrated in FIGS. 1 and 2) because it is thinner (less complex semiconductor mounting material) and does not include an angled bottom surface requiring dicing or other relatively complex cutting steps. Also, subassembly 400 is fabricated with fewer steps because the formation of thermal interconnects between submount 416 and heatsink 432 is not included in this embodiment.

Figure 5:
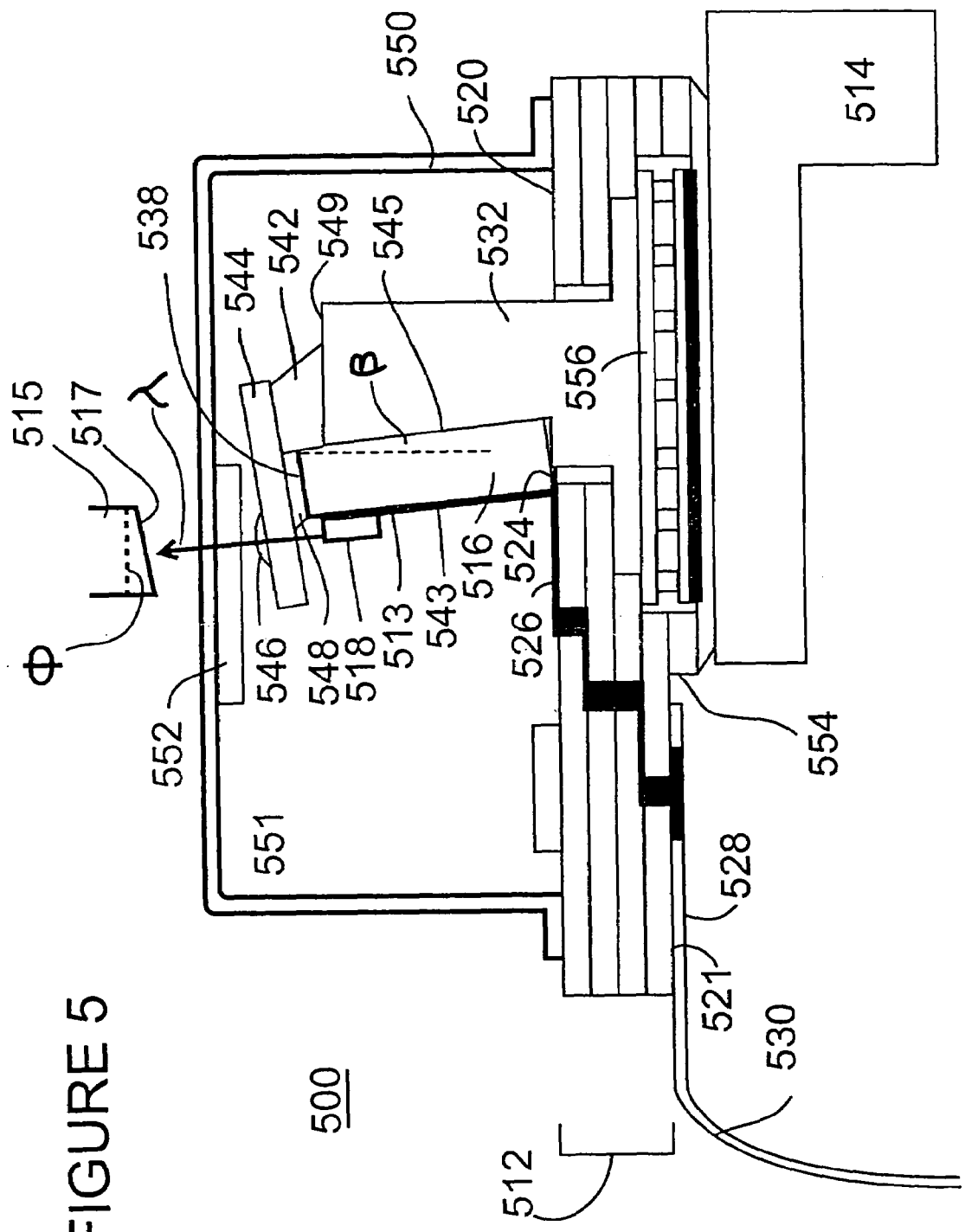
FIG. 5 is a sectional view of another embodiment of an optical subassembly in accordance with the present invention.

Turn now to FIG. 5 which illustrates an embodiment of an optical subassembly 500 in accordance with the present invention. It will be understood that in the following discussion, components which are similar to elements illustrated in FIG. 4 are designated with similar numbers beginning with a "5" in front to indicate the different embodiment. For example, external conductive interconnect 430 illustrated in FIG. 4 is referred to as external conductive interconnect 530 in FIG. 5. Also, the above description of the various components in FIG. 4 applies equally to similar components illustrated in FIG. 5.

In this embodiment, optical subassembly 500 includes a thermal electric cooler 556 positioned on heat spreader 514, between heatsink 532 and heat spreader 514. Thermal electric cooler 556 provides additional heat conduction away from optoelectric device 518. A sealing ring 554 is positioned around the periphery of thermal electrical cooler 556 to provide a hermetic seal as will be discussed presently. Sealing ring 554 may include a seam seal, a seal ring brazed to substrate 512, heat spreader 514, and thermal electric cooler 556, Kovar, or another material to provide hermetic sealing utilizing a relatively thin layer.

In this embodiment, an encapsulant structure 550 is positioned on upper surface 520 of substrate 512 to provide a hermetic seal for optoelectric device 518. Encapsulant structure 550 includes a window 552 formed of material transparent to the operating wave length, λ, to allow light (designated λ for convenience of understanding) to travel between optoelectric device 518 and the exterior of encapsulant structure 550. Substrate 512, seam seal 554, heat spreader 514, and encapsulating structure 550, all hermetically sealed together, form a hermetically sealed cavity 551 for optoelectric device 518. In this embodiment, the hermetically sealed cavity is formed large enough to house various optical components, such as optical lens 544, 546 and/or an optical isolator (not shown).

In this embodiment, lens 546 is formed of plastic and may be, for example, molded to simplify manufacturing of optical subassembly 500. It should be understood that the term "plastic" is used herein as a generic term to describe any non-glass optical material that operates to transmit optical beams of interest therethrough and which can be conveniently formed into lenses and the like. In some specific applications optical lens 544 and/or lens 546 may be formed of glass or some similar material. For example, in most optical modules used at the present time the optical beams are generated by a laser that operates in the infrared band and any materials that transmit this light, including some oxides and nitrides, come within this definition.

Optical subassembly 500 is optimally aligned to optical fiber 515 as discussed above by choosing the angle β of wall 545 of heatsink 532. Further, subassembly 500 includes a thermally conductive path through submount 516, heatsink 532, thermal electric cooler 556, and heat spreader 514 to conduct heat generated by optoelectric device 518 away from optoelectric device 518 and subassembly 500. In addition, the cost of laser submount 516 is reduced (relative to the embodiments illustrated in FIGS. 1 and 2) because it is thinner (less complex semiconductor mounting material) and does not include an angled bottom surface requiring dicing or other relatively complex cutting steps. Also, subassembly 500 is fabricated with fewer steps because the formation of thermal interconnects between submount 516 and heatsink 532 is not required in this embodiment.

Thus, a new and improved optical subassembly has been disclosed. The optical subassembly provides an improved thermal conductivity path away from the optical device. Further, the optical alignment is improved because the optical device is directed at an angle for better coupling with a light receiving device, such as an optical fiber. In many optical subassemblies of this nature the light is directed at an angle to the fiber facet to reduce reflections back into the optical subassembly (i.e. the optical device). The subassembly also provides a better hermetic seal for an optical device which increases the optical device yield and lifetime. Further, the subassembly structure provides a large hermetically sealed volume for the placement of various optical components, such as one or more lenses and/or an optical isolator.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An optical subassembly comprising:
   a substrate with electrically conductive interconnects thereon, the substrate including first and second opposed surfaces and at least a portion of the electrically conductive interconnects being positioned on the first surface;
   a heat spreader having a surface;
   a submount including a submount mounting surface and a component mounting surface, one of the submount mounting surface and the component mounting surface including an angle, and the submount positioned on one of the surface of the heat spreader and the first opposed surface of the substrate such that the component mounting surface is positioned at the angle relative to the first opposed surface of the substrate;
   an optoelectric device with a component interconnect positioned on the component mounting surface and the component interconnect of the optoelectric device coupled to the electrically conductive interconnects of the substrate, the optoelectric device being thermally coupled to the heat spreader through the submount to provide a low thermal resistance between the optoelectric device and the heat spreader; and
   an encapsulant structure mounted on the first opposed surface of the substrate and hermetically enclosing the optoelectric device.

2. An optical subassembly as claimed in claim 1 wherein the submount mounting surface of the submount is angled relative to the component mounting surface and is positioned on the first surface of the substrate and the substrate is positioned on the surface of the heat spreader.

3. An optical subassembly as claimed in claim 2 wherein the substrate includes a plurality of thermal vias extending between the submount mounting surface and the surface of the heat spreader.

4. An optical subassembly as claimed in claim 1 wherein electrically conductive interconnects of the substrate extend between terminals on the first surface and terminals on the second surface.

5. An optical subassembly as claimed in claim 1 wherein the component mounting surface of the submount is angled relative to the submount mounting surface and the submount mounting surface is positioned on the surface of the heat spreader.

6. An optical subassembly as claimed in claim 5 wherein the submount includes a heat sink.

7. An optical subassembly as claimed in claim 6 wherein the heat sink includes the component mounting surface and the submount mounting surface.

8. An optical subassembly as claimed in claim 1 wherein the component mounting surface of the submount is angled relative to the submount mounting surface and the submount mounting surface is positioned on one surface of a thermal electric cooler and a second surface of the thermal electric cooler is positioned on the surface of the heat spreader.

9. An optical subassembly as claimed in claim 1 wherein the submount includes a component mounting portion with a surface and a heatsink with a surface, the surface of the component mounting portion being formed to mate with the surface of the heat sink, one of the surface of the component mounting portion and the surface of the heat sink angled relative to the component mounting surface and the heat sink being positioned on the surface of the heat spreader.

10. An optical subassembly as claimed in claim 1 wherein the encapsulant structure includes a window positioned to pass light between the optoelectric device and an externally mounted optical fiber, the optical subassembly further including an optical element mounted on the submount so as to be interposed in the light between the optoelectric device and the window.

11. An optical subassembly as claimed in claim 10 wherein the optical fiber has an angularly cut facet positioned external to the window in the encapsulant structure for receiving light from the optoelectric device, the one of the surface of the component mounting portion and the surface of the heat sink being angled so that the optoelectric device and the facet of the optical fiber are optimally aligned.

12. An optical subassembly comprising:
   a substrate with electrically conductive interconnects thereon, the substrate including first and second opposed surfaces and at least a portion of the electrically conductive interconnects being positioned on the first surface;
   a heat spreader having a surface;
   a submount including a submount mounting surface and a component mounting surface, one of the submount mounting surface and the component mounting surface including an angle, and the submount positioned on one of the surface of the heat spreader and the first opposed surface of the substrate such that the component mounting surface is positioned at the angle relative to the first opposed surface of the substrate;

an optoelectric device with a component interconnect positioned on the component mounting surface and the component interconnect of the optoelectric device coupled to the electrically conductive interconnects of the substrate, the optoelectric device being thermally coupled to the heat spreader through the submount to provide a low thermal resistance between the optoelectric device and the heat spreader;

an encapsulant structure mounted on the first opposed surface of the substrate and hermetically enclosing the optoelectric device, the encapsulant structure including a window positioned to pass light between the optoelectric device and an externally mounted optical fiber; and an optical element mounted on one of the window and the submount so as to be interposed in light passing between the window and the optical fiber.

13. An optical subassembly as claimed in claim 12 wherein the submount mounting surface of the submount is angled relative to the component mounting surface and is positioned on the first surface of the substrate and the substrate is positioned on the surface of the heat spreader.

14. An optical subassembly as claimed in claim 13 wherein the substrate includes a plurality of thermal vias extending between the submount mounting surface and the surface of the heat spreader.

15. An optical subassembly as claimed in claim 12 wherein electrically conductive interconnects of the substrate extend between terminals on the first surface and terminals on the second surface.

16. An optical subassembly as claimed in claim 12 wherein the component mounting surface of the submount is angled relative to the submount mounting surface and the submount mounting surface is positioned on the surface of the heat spreader.

17. An optical subassembly as claimed in claim 16 wherein the submount includes a heat sink.

18. An optical subassembly as claimed in claim 17 wherein the heat sink includes the component mounting surface and the submount mounting surface.

19. An optical subassembly as claimed in claim 12 wherein the component mounting surface of the submount is angled relative to the submount mounting surface and the submount mounting surface is positioned on one surface of a thermal electric cooler and a second surface of the thermal electric cooler is positioned on the surface of the heat spreader.

20. An optical subassembly as claimed in claim 12 wherein the submount includes a component mounting portion with a surface and a heatsink with a surface, the surface of the component mounting portion being formed to mate with the surface of the heat sink, one of the surface of the component mounting portion and the surface of the heat sink angled relative to the component mounting surface and the heat sink being positioned on the surface of the heat spreader.

21. An optical subassembly as claimed in claim 20 wherein including an optical fiber with an angularly cut facet positioned external to the window in the encapsulant structure for receiving light from the optoelectric device, the one of the surface of the component mounting portion and the surface of the heat sink being angled so that the optoelectric device and the facet of the optical fiber are optimally aligned.

22. An optical subassembly comprising:

a substrate with electrically conductive interconnects thereon, the substrate including first and second opposed surfaces and at least a portion of the electrically conductive interconnects being positioned on the first surface;

a heat spreader having a surface;

a submount including a submount mounting surface and a component mounting surface, one of the submount mounting surface and the component mounting surface including an angle, and the submount positioned on one of the surface of the heat spreader and the first opposed surface of the substrate such that the component mounting surface is positioned at the angle relative to the first opposed surface of the substrate;

a semiconductor laser with a component interconnect positioned on the component mounting surface and the component interconnect of the semiconductor laser coupled to the electrically conductive interconnects of the substrate, the semiconductor laser being thermally coupled to the heat spreader through the submount to provide a low thermal resistance between the semiconductor laser and the heat spreader;

an encapsulant structure mounted on the first opposed surface of the substrate and hermetically enclosing the semiconductor laser, the encapsulant structure including a window positioned to pass light from the semiconductor laser external to the encapsulant structure;

an optical fiber with an angularly cut facet positioned external to the window in the encapsulant structure for receiving light from the semiconductor laser;

an optical element mounted on one of the window and the submount so as to be interposed in light passing between the semiconductor laser and the window; and the one of the submount mounting surface and the component mounting surface being angled so that the optoelectric device and the facet of the optical fiber are optimally aligned.

* * * * *